United States Patent
Pham (10) Patent No.: US 11,017,119 B2
(45) Date of Patent: May 25, 2021

(54) METHODS, SYSTEMS, AND MEDIA FOR DETECTING ALTERATION OF A WEB PAGE

(71) Applicants: Synergex Group, Greenwich, CT (US); Wayne Taylor, Chandler, AZ (US); Pham Holdings Inc., Lacey, WA (US)

(72) Inventor: Thien Van Pham, Lacey, WA (US)

(73) Assignees: Synergex Group, Greenwich, CT (US); Pham Holdings Inc., Lacey, WA (US); Wayne Taylor, Chandler, AZ (US)

( * ) Notice: Subject to any disclaimer, the term of this patent is extended or adjusted under 35 U.S.C. 154(b) by 85 days.

(21) Appl. No.: 16/220,584

(22) Filed: Dec. 14, 2018

(65) Prior Publication Data

US 2020/0193061 A1 Jun. 18, 2020

(51) Int. Cl.
*H04L 29/06* (2006.01)
*G06F 21/62* (2013.01)
*G06F 21/51* (2013.01)
*G06F 16/955* (2019.01)

(52) U.S. Cl.
CPC ........ *G06F 21/6263* (2013.01); *G06F 16/955* (2019.01); *G06F 21/51* (2013.01); *G06F 2221/2119* (2013.01); *G06F 2221/2149* (2013.01)

(58) Field of Classification Search
CPC ..... H04L 63/12; H04L 63/14; G06F 21/6263; G06F 16/955; G06F 21/51; G06F 2221/2119; G06F 2221/2149
See application file for complete search history.

(56) References Cited

U.S. PATENT DOCUMENTS

| | | | | |
|---|---|---|---|---|
| 5,978,842 A | * | 11/1999 | Noble | G06F 16/957 709/218 |
| 7,313,823 B2 | * | 12/2007 | Gao | G06F 21/645 713/165 |
| 8,615,800 B2 | * | 12/2013 | Baddour | H04L 63/1441 726/22 |
| 8,752,183 B1 | * | 6/2014 | Heiderich | G06F 21/577 726/22 |
| 9,087,024 B1 | * | 7/2015 | Hayden | G06F 3/0481 |
| 9,614,869 B2 | * | 4/2017 | Prieto Alvarez | G06F 16/951 |
| 10,135,936 B1 | * | 11/2018 | Venuraju | G06F 11/3414 |
| 2003/0145197 A1 | * | 7/2003 | Lee | G06F 21/64 713/155 |
| 2006/0168510 A1 | * | 7/2006 | Bryar | G06F 40/131 715/229 |

(Continued)

OTHER PUBLICATIONS

International Search Report and Written Opinion dated Feb. 25, 2020 in International Patent Application No. PCT/US2019/065747.

*Primary Examiner* — Malcolm Cribbs
(74) *Attorney, Agent, or Firm* — Byrne Poh LLP (57) ABSTRACT

Methods, systems, and media for detecting alteration of a web page are provided. In some embodiments, a method for detecting alteration of a web page is provided, the method comprising: analyzing a web page; generating a forensic footprint associated with the web page based on the analyzing; determining whether the forensic footprint matches reference information associated with the web page; and in response to determining that the forensic footprint does not match the reference information, blocking at least a portion of the web page from being presented.

15 Claims, 6 Drawing Sheets

(56) References Cited

U.S. PATENT DOCUMENTS

| | | | |
|---|---|---|---|
| 2006/0277462 A1* | 12/2006 | Umbreit | G06Q 10/10 |
| | | | 715/205 |
| 2009/0249445 A1 | 10/2009 | Deshpande et al. | |
| 2011/0307955 A1* | 12/2011 | Kaplan | G06F 21/56 |
| | | | 726/23 |
| 2012/0255027 A1* | 10/2012 | Kanakapura | H04L 63/126 |
| | | | 726/26 |
| 2013/0276126 A1* | 10/2013 | Zhou | G06F 21/577 |
| | | | 726/25 |
| 2014/0067784 A1* | 3/2014 | Wang | G06F 16/3344 |
| | | | 707/706 |
| 2014/0281919 A1 | 9/2014 | Giulliani et al. | |
| 2014/0317754 A1 | 10/2014 | Niemela et al. | |
| 2014/0331119 A1* | 11/2014 | Dixon | G06Q 30/02 |
| | | | 715/234 |
| 2014/0359411 A1* | 12/2014 | Botta | G06F 40/197 |
| | | | 715/205 |
| 2015/0020204 A1* | 1/2015 | Wang | H04L 63/1433 |
| | | | 726/25 |
| 2016/0134588 A1* | 5/2016 | Falkowitz | H04L 63/1441 |
| | | | 726/11 |
| 2016/0219033 A1* | 7/2016 | Hintermeister | H04L 63/083 |
| 2016/0226900 A1* | 8/2016 | Fajardo Verano | G06F 21/55 |
| 2017/0006046 A1 | 1/2017 | Kuskov et al. | |
| 2017/0289267 A1* | 10/2017 | Eschbach | H04L 67/02 |
| 2018/0091535 A1* | 3/2018 | Chrosziel | G06F 11/302 |
| 2018/0205704 A1* | 7/2018 | Terry | G06F 16/9535 |

* cited by examiner

METHODS, SYSTEMS, AND MEDIA FOR DETECTING ALTERATION OF A WEB PAGE

TECHNICAL FIELD

The disclosed subject matter relates to methods, systems, and media for detecting alteration of a web page.

BACKGROUND

Internet browsers present web pages to users. Many Internet browsers include browser extensions, which are scripted programs that run after a web page has been loaded in a browser. These scripted programs can alter a web page by adding and/or removing web page content. For example, a web page can be altered to include an input field not part of the original web page, which can cause a user to inadvertently enter highly confidential information within the input field to be sent to a hacker's desired destination. Once the hacker has received the information, he or she can use the information to compromise the original owner of the information, such as by accessing the original owner's bank accounts or other sensitive records.

Accordingly, it is desirable to provide new methods, systems, and media for detecting alteration of a web page.

SUMMARY

Methods, systems, and media for detecting alteration of a web page are provided. In accordance with some embodiments of the disclosed subject matter, a method for detecting alteration of a web page is provided, the method comprising: analyzing, using a hardware processor, a web page; generating, using the hardware processor, a forensic footprint associated with the web page based on the analyzing; determining, using the hardware processor, whether the forensic footprint matches reference information associated with the web page; and in response to determining that the forensic footprint does not match the reference information, blocking, using the hardware processor, at least a portion of the web page from being presented.

In some embodiments, the forensic footprint comprises at least one of a size of the web page, a number of scripted files included in the web page, a number of user input fields included in the web page, a number of selectable icons included in the web page, a number of images included in the web page, and information indicating content of the web page.

In some embodiments, the reference information comprises a reference footprint associated with the web page and generated prior to the receiving.

In some embodiments, the method further comprises retrieving the reference footprint using an identifier associated with a request for the web page.

In some embodiments, the method further comprises at least one of redirecting a browser to another web page and presenting a notification to a user.

In some embodiments, the method further comprises, in response to determining that the forensic footprint matches the reference information, iteratively performing the analyzing, the generating, and the determining after a predetermined amount of time.

In accordance with some embodiments of the disclosed subject matter, a system for detecting alteration of a web page is provided, the system comprising: a hardware processor configured to: analyze a web page; generate a forensic footprint associated with the web page based on the analyzing; determine whether the forensic footprint matches reference information associated with the web page; and in response to determining that the forensic footprint does not match the reference information, block at least a portion of the web page from being presented.

In accordance with some embodiments of the disclosed subject matter, a non-transitory computer-readable medium containing computer-executable instructions that, when executed by a processor, cause the processor to perform a method for detecting alteration of a web page, the method comprising: analyzing a web page; generating a forensic footprint associated with the web page based on the analyzing; determining whether the forensic footprint matches reference information associated with the web page; and in response to determining that the forensic footprint does not match the reference information, blocking at least a portion of the web page from being presented.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

In accordance with various embodiments, mechanisms (which can include methods, systems, and media) for detecting alteration of a web page are provided.

In some embodiments, the mechanisms described herein can monitor for alteration of a web page. For example, in some embodiments, the mechanisms described herein can analyze a web page and generate a forensic footprint of the web page based on the analysis, including information indicative of: a size of the web page, a number of scripted files included in the web page, a number of user input fields included in the web page, and number of buttons and/or selectable icons included in the web page, a number of images included in the web page, content (e.g., images, video, text, graphical elements, and/or any other suitable content) included in the web page, location(s) of the content within the web page, colors included in the web page, text font used in the web page, a cryptographic hash of the entire web page, a cryptographic hash of one or more portions of the web page, a cryptographic hash of one or more images included in the web page, and/or any other suitable information. The mechanisms described herein can then compare the forensic footprint to a reference footprint stored at a server in some embodiments.

In some embodiments, the mechanisms described herein can perform remedial action if it is determined that the forensic footprint does not match the reference footprint, such as blocking at least a portion of the web page from being presented. Alternatively, if it is determined that the forensic footprint matches the reference footprint, then the mechanisms described herein can wait a predetermined amount of time before repeating the analysis of the web page, generation of another forensic footprint, comparison of the forensic footprint to the reference footprint in some embodiments. Accordingly, in some embodiments, the mechanisms described herein can continuously monitor for alteration of the web page.

In some embodiments, the mechanisms described herein can improve computer security by detecting one or more differences between a presented web page and the web page as originally intended, which may otherwise not be known by a user. Accordingly, in some embodiments, the mechanisms described herein can protect the user from exposing sensitive information to unwanted third parties.

Figure 1:
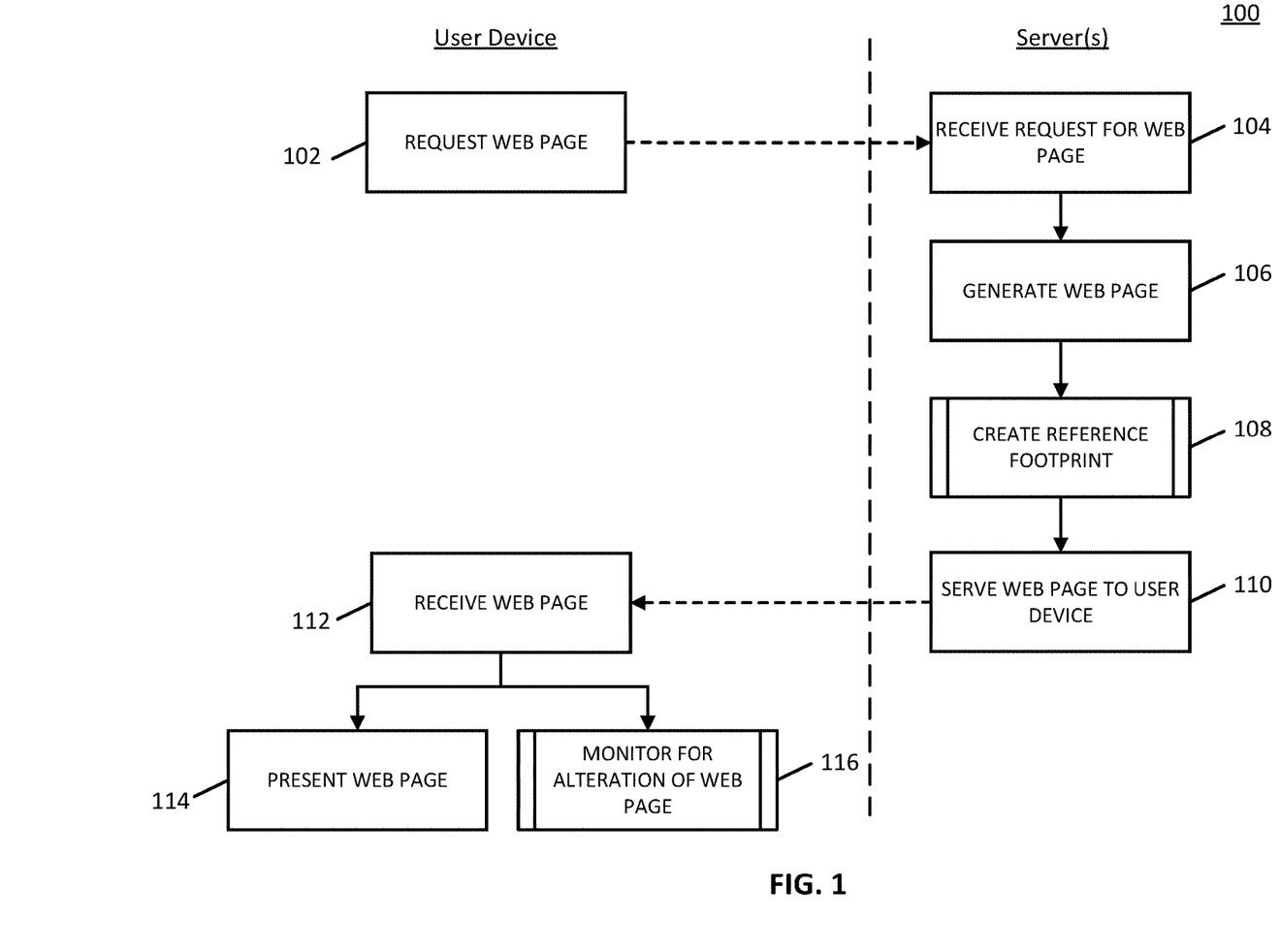
FIG. 1 shows an example of a flow diagram for detecting alteration of a web page in accordance with some embodiments of the disclosed subject matter.

Turning to FIG. 1, an example 100 of a flow diagram for detecting alteration of a web page is shown in accordance with some embodiments of the disclosed subject matter. In some embodiments, blocks of information flow diagram 100 can be executed by one or more suitable computing devices, such as one or more user devices, one or more servers, and/or one or more other suitable computing devices as shown and described in connection with FIGS. 5 and 6.

At 102, a user device can issue a request for a web page. For example, in some embodiments, a user can use an Internet browser executing on the user device to navigate to a web page, which can cause the Internet browser to issue a request to one or more servers for the web page.

At 104, the server can receive the request for the web page.

At 106, the server can generate the requested web page. In some embodiments, the generated web page can include one or more scripted files, one or more user input fields, one or more buttons and/or other selectable icons, one or more images, and/or any other suitable content.

At 108, the server can create a reference footprint of the generated web page. For example, in some embodiments, the server can create a reference footprint in the manner as shown and described in connection with FIG. 2.

Figure 2:
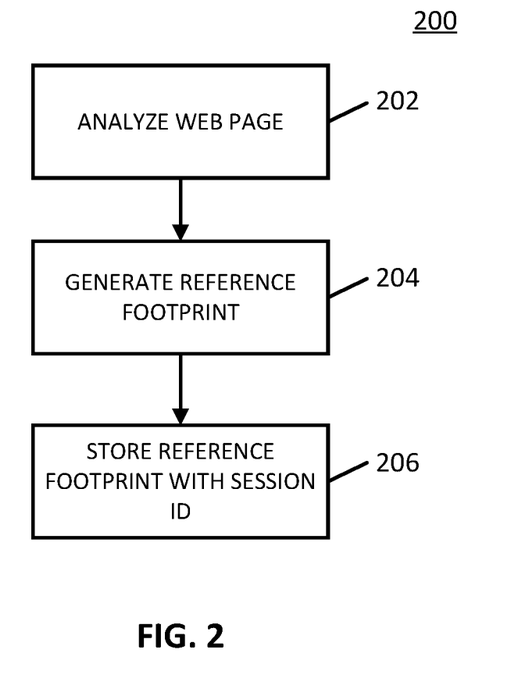
FIG. 2 shows an example of a process for creating a reference footprint in accordance with some embodiments of the disclosed subject matter.

Turning to FIG. 2, an example 200 of a process for creating a reference footprint is shown in accordance with some embodiments of the disclosed subject matter. In some embodiments, blocks of process 200 can be executed by one or more servers, as shown and described in connection with FIGS. 5 and 6.

At 202, a server can analyze a web page. For example, in some embodiments, the server can parse the web page and detect one or more elements of the web page. Note that, in some embodiments, the elements of the web page can include one or more scripted files, one or more user input fields, one or more buttons and/or selectable icons, one or more images, and/or any other suitable content or information. In some embodiments, the server can analyze the web page in any suitable manner.

At 204, the server can generate a reference footprint for the web page. In some embodiments, the server can generate the reference footprint based on the analysis of the web page performed in 202. In some embodiments, the server can generate a reference footprint in any suitable manner and having any suitable format.

Note that, in some embodiments, a reference footprint can include information indicative of: a size of the web page, a number of scripted files included in the web page, a number of user input fields included in the web page, a number of buttons and/or selectable icons included in the web page, a number of images included in the web page, content (e.g., images, video, text, graphical elements, and/or any other suitable content) included in the web page, location(s) of the content within the web page, colors included in the web page, text font used in the web page, a cryptographic hash of the entire web page, a cryptographic hash of one or more portions of the web page, a cryptographic hash of one or more images included in the web page, and/or any other suitable information for detecting an anomaly in the web page.

At 206, the server can store the reference footprint. For example, in some embodiments, the server can store the reference footprint locally and/or remotely, such as at a database server and/or any other suitable location. In some embodiments, the server can store the reference footprint using a unique identifier associated with the request for the web page. For example, in some embodiments, a unique identifier can include a user ID associated with a user that requested the web page, a session ID associated with a browsing session, a device ID associated with the user device, and/or any other suitable identifier to associate the request for the web page with the reference footprint.

Turning back to FIG. 1, at 110, the server can respond to the request by serving the web page to the user device. Additionally, in some embodiments, the server can serve a set of instructions for monitoring for alteration of a web page to the user device. For example, in some embodiments, the set of instructions can include a scripted program, a browser extension, and/or any other suitable set of instructions.

At 112, the user device can receive the web page. Additionally, in some embodiments, the user device can receive the set of instructions for monitoring for alteration of a web page. Note that, in some embodiments, the set of instructions can be previously installed on the user device, and therefore receipt of the set of instructions in 112 can be omitted.

At 114, the user device can present the web page to the user. For example, in some embodiments, the user device can present the web page in a browser executing on the user device.

At 116, the user device can monitor for alteration of a web page. For example, in some embodiments, the user device can monitor alteration of a web page in the manner as shown and described in connection with FIG. 3. In some embodiments, the user device can monitor for alteration of the web page by executing the set of instructions discussed in connection with 112.

Note that, although FIG. 1 shows the user device presenting the web page (block 114) substantially in parallel with monitoring for alteration of the web page (block 116), in some embodiments, the user device can first present the web page prior to performing one or more iterations of monitoring for alteration of the web page, as will be discussed in further detail below. Alternatively, in some embodiments, the user device can perform one or more iterations of monitoring for alteration of the web page prior to presenting the web page to the user.

Figure 3:
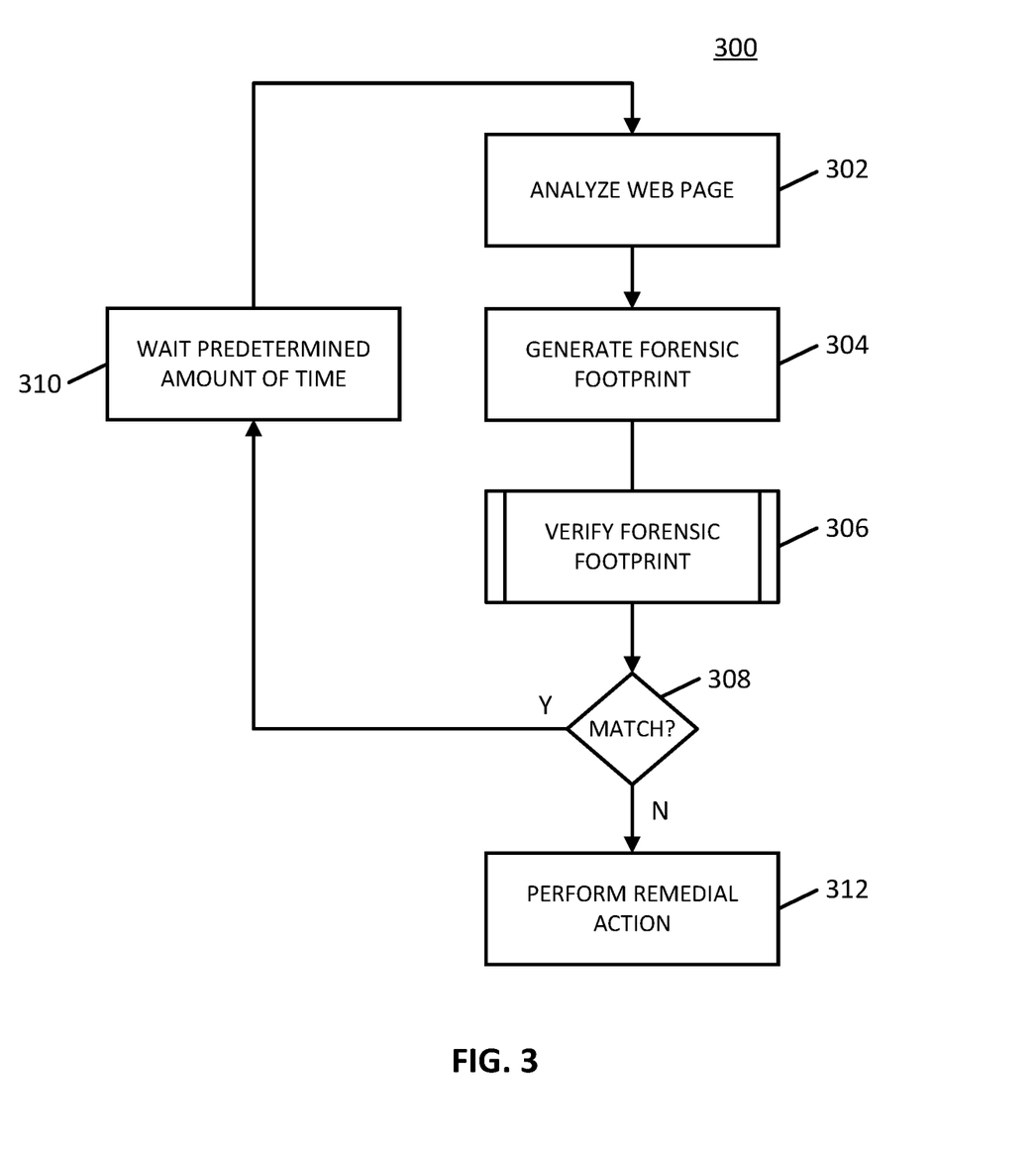
FIG. 3 shows an example of a process for monitoring for alteration of a web page in accordance with some embodiments of the disclosed subject matter.

Turning to FIG. 3, an example 300 of a process for monitoring for alteration of a web page is shown in accordance with some embodiments of the disclosed subject matter. In some embodiments, blocks of process 300 can be executed by one or more user devices, as shown and described in connection with FIGS. 5 and 6.

At 302, a user device can analyze a web page. For example, in some embodiments, the user device can parse the web page and detect one or more elements (e.g., one or more scripted files, one or more user input fields, one or more buttons and/or selectable icons, one or more images, video, text, one or more graphical elements, and/or any other suitable content or information) of the web page. Note that, in some embodiments, the web page presented at the user device may be different from the web page as originally served by a server, such as due to one or more alterations performed by a browser extension and/or scripted program executing on the user device. In some embodiments, the user device can analyze the web page in any suitable manner.

At 304, the user device can generate a forensic footprint for the web page. In some embodiments, the user device can generate the forensic footprint based on the analysis of the web page performed in 302. In some embodiments, the user device can generate a forensic footprint in a similar manner and in a similar format as a server generating the reference footprint in 204. In some embodiments, the user device can generate a forensic footprint in any suitable manner and having any suitable format.

Note that, in some embodiments, a forensic footprint can include information indicative of: a size of the web page, a number of scripted files included in the web page, a number of user input fields included in the web page, and number of buttons and/or selectable icons included in the web page, a number of images included in the web page, content (e.g., images, video, text, graphical elements, and/or any other suitable content) included in the web page, location(s) of the content within the web page, colors included in the web page, text font used in the web page, a cryptographic hash of the entire web page, a cryptographic hash of one or more portions of the web page, a cryptographic hash of one or more images included in the web page, and/or any other suitable information for detecting an anomaly in the web page.

At 306, the user device can verify whether the forensic footprint matches a corresponding reference footprint. For example, in some embodiments, the user device can verify in the manner as shown and described in connection with FIG. 4.

Figure 4:
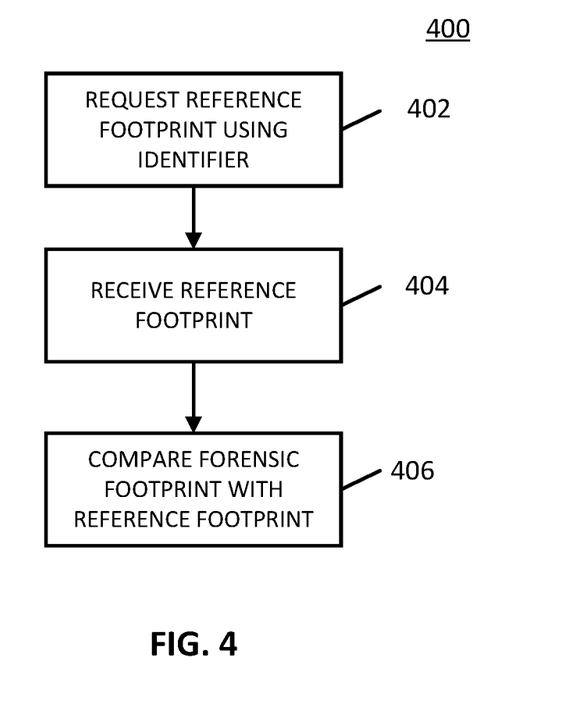
FIG. 4 shows an example of a process for verifying whether a forensic footprint matches a corresponding reference footprint in accordance with some embodiments of the disclosed subject matter.

Turning to FIG. 4, an example 400 of a process for verifying whether a forensic footprint matches a corresponding reference footprint is shown in accordance with some embodiments of the disclosed subject matter. In some embodiments, blocks of process 400 can be executed by one or more user devices, as shown and described in connection with FIGS. 5 and 6.

At 402, a user device can retrieve a reference footprint. For example, in some embodiments, the user device can issue a request to a server for a reference footprint. In some embodiments, the request can include the unique identifier (e.g., user ID, session ID, device ID, and/or any other suitable identifier) associated with the request for the web page and/or any other suitable information.

At 404, the user device can receive a reference footprint from the server in response to the request. For example, in some embodiments, the user device can receive the reference footprint previously stored with the unique identifier.

At 406, the user device can compare the forensic footprint to the reference footprint. For example, in some embodiments, the user device can compare information indicative of: a size of the web page, a number of scripted files included in the web page, a number of user input fields included in the web page, and number of buttons and/or selectable icons included in the web page, a number of images included in the web page, content (e.g., images, video, text, graphical elements, and/or any other suitable content) included in the web page, location(s) of the content within the web page, colors included in the web page, text font used in the web page, a cryptographic hash of the entire web page, a cryptographic hash of one or more portions of the web page, a cryptographic hash of one or more images included in the web page, and/or any other suitable information for detecting an anomaly in the web page included in the forensic footprint with corresponding information included in the reference footprint. In some embodiments, the user device can compare the forensic footprint to the reference footprint in any suitable manner.

Note that, in some embodiments, a result of the comparison performed in 406 can include information indicating that the forensic footprint matches the reference footprint, information indicating that the forensic footprint does not match the reference footprint, and/or any other suitable information. In some embodiments, the result can also include comprehensive results of comparing each element (e.g., information indicative of: a size of the web page, a number of scripted files included in the web page, a number of user input fields included in the web page, and number of buttons and/or selectable icons included in the web page, a number of images included in the web page, content (e.g., images, video, text, graphical elements, and/or any other suitable content) included in the web page, location(s) of the content within the web page, colors included in the web page, text font used in the web page, a cryptographic hash of the entire web page, a cryptographic hash of one or more portions of the web page, a cryptographic hash of one or more images included in the web page, and/or any other suitable information for detecting an anomaly in the web page) included in the forensic footprint with corresponding information included in the reference footprint. For example, in some embodiments, the results can include information indicating a number of elements of the forensic footprint that match or do not match the reference footprint, information indicating one or more types of elements of the forensic footprint that match or do not match the reference footprint, information indicating one or more differences between each element of the forensic footprint and a corresponding element of the reference footprint, and/or any other suitable information.

Alternatively, in some embodiments, a user device can issue a request to a server to verify a forensic footprint with a corresponding reference footprint. For example, in some embodiments, the request can include the forensic footprint generated by the user device, the unique identifier associated with the request for the web page, and/or any other suitable information. The server can then perform a comparison between the forensic footprint with the reference footprint previously stored with the unique identifier, such as in the manner discussed in connection with 406, and return a result of the comparison to the user device in some embodiments.

Turning back to FIG. 3, at 308, the user device can determine whether a forensic footprint matches a corresponding reference footprint based on a verification performed in 306. For example, in some embodiments, the user device can determine whether the forensic footprint matches the corresponding reference footprint based on a result of a comparison performed in 406 (e.g., information indicating that the forensic footprint matches the reference footprint, information indicating that the forensic footprint does not match the reference footprint, etc.). If the user device determines that the forensic footprint matches the reference footprint, then the user device can proceed to 310 in some embodiments. However, in some embodiments, if the user device determines that the forensic footprint does not match the reference footprint, then the user device can proceed to 312.

At 310, the user device can wait a predetermined amount of time before proceeding to 302 to analyze the web page. For example, in some embodiments, the predetermined amount of time can be five minutes, fifteen minutes, one hour, and/or any suitable amount of time. Accordingly, the user device can continuously monitor for alteration of the web page in some embodiments.

At 312, the user device can perform remedial action. For example, in some embodiments, the user device can block at least a portion of the web page from being loaded and/or presented. That is, the user device can block one or more portions (e.g., scripted files, user input fields, buttons and/or selectable icons, images, and/or any other suitable elements) of the web page or the entire web page from being loaded and/or presented in some embodiments. In some embodiments, the user can device can block at least a portion of the web page locally using a host-based firewall, remotely using a network firewall, and/or in any suitable manner. In another example, in some embodiments, the user device can redirect a browser executing on the user device to a predetermined web page, such as an error page or any other suitable web page. Additionally or alternatively, in some embodiments, the user device can cause a notification to be presented to the user. For example, in some embodiments, the notification can include a result of the result of the comparison performed in 406 and/or any other suitable information. In some embodiments, the user device can perform any other suitable action.

Figure 5:
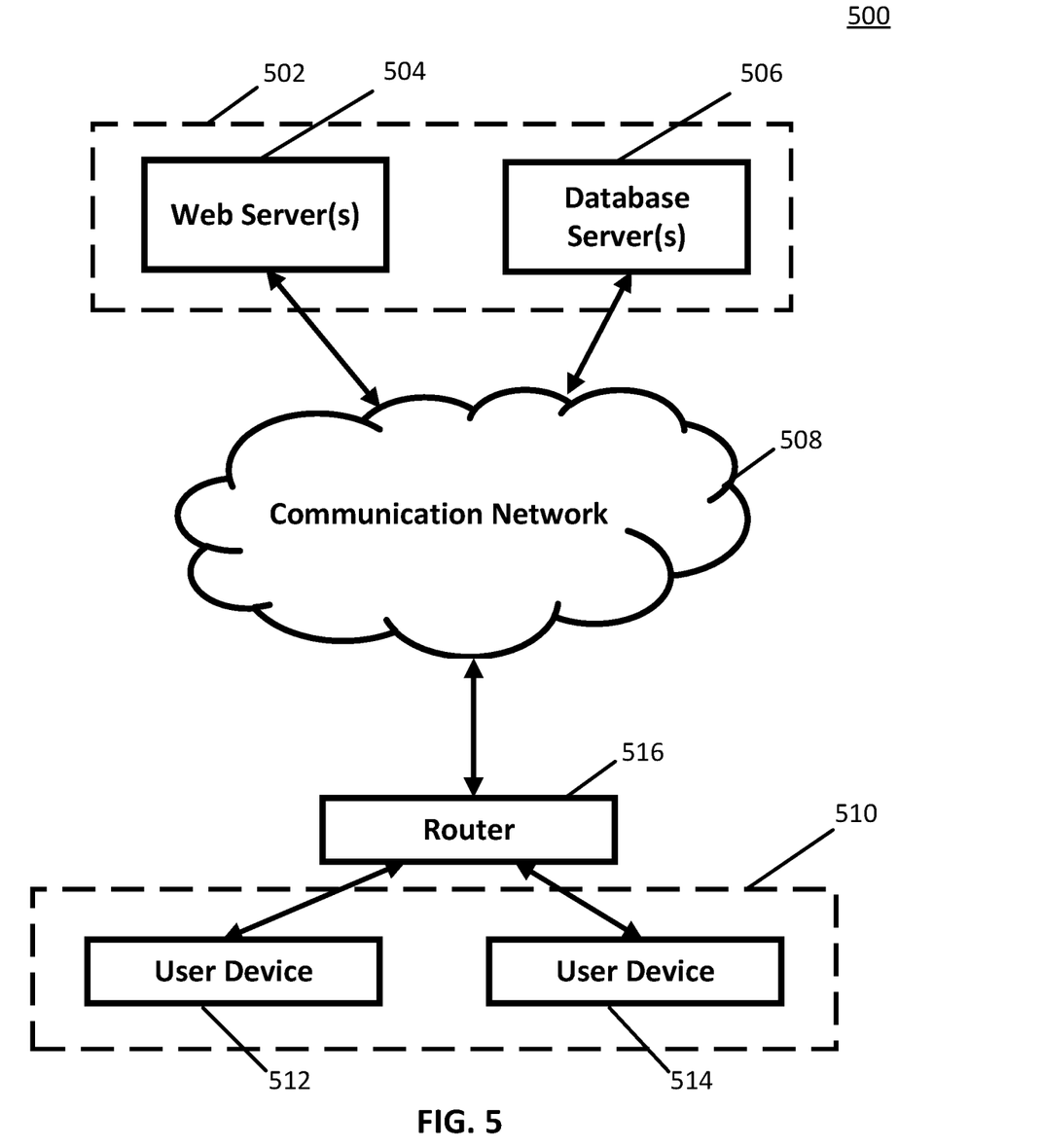
FIG. 5 shows a diagram of an illustrative system suitable for detecting alteration of a web page in accordance with some embodiments of the disclosed subject matter.

Turning to FIG. 5, an example 500 of hardware for detecting alteration of a web page in accordance with some embodiments of the disclosed subject matter is shown. As illustrated, hardware 500 can include one or more servers 502, such as web server 504 and database server 506, a communication network 508, one or more user devices 510, such as user device 512 and user device 514, and/or a router 516.

In some embodiments, functions performed by each of servers 502 and/or user devices 510 are described above in connection with FIGS. 1-4.

Communication network 508 can be any suitable combination of one or more wired and/or wireless networks in some embodiments. For example, communication network 508 can include any one or more of the Internet, an intranet, a wide-area network (WAN), a local-area network (LAN), a wireless network, a digital subscriber line (DSL) network, a frame relay network, an asynchronous transfer mode (ATM) network, a virtual private network (VPN), and/or any other suitable communication network. User devices 510 can be connected by one or more communications links to communication network 508 that can be linked via one or more communications links to any of servers 502. The communications links can be any communications links suitable for communicating data among user devices 510 and servers 502, such as network links, dial-up links, wireless links, hard-wired links, any other suitable communications links, or any suitable combination of such links. In some embodiments, connection to communication network 508 can be through any suitable device, such as router 516.

User devices 510 can include any one or more user devices (such as user device 512 and/or user device 514) suitable for accessing and using any websites, apps, and/or services. For example, in some embodiments, user devices 510 can include a mobile device, such as a mobile phone, a tablet computer, a wearable computer, a laptop computer, a vehicle (e.g., a car, a boat, an airplane, or any other suitable vehicle) information and/or entertainment system, and/or any other suitable mobile device. As another example, in some embodiments, user devices 510 can include a non-mobile device, such as a television, a projector device, a game console, desktop computer, and/or any other suitable non-mobile device.

Although servers 502 are illustrated as multiple devices, the functions performed by servers 502 can be performed using any suitable number of devices (including only one) in some embodiments. For example, in some embodiments, one, two, three, or more devices can be used to implement the functions performed by servers 502.

Although two user devices 512 and 514 are shown in FIG. 5 to avoid over-complicating the figure, any suitable number of user devices (including only one), and/or any suitable types of user devices, can be used in some embodiments.

Servers 502 and user devices 510 can be implemented using any suitable hardware in some embodiments. For example, in some embodiments, servers 502 and user devices 510 can be implemented using any suitable general-purpose computer or special-purpose computer. For example, a mobile phone may be implemented using a special-purpose computer. Any such general-purpose computer or special-purpose computer can include any suitable hardware. For example, as illustrated in example hardware 600 of FIG. 6, such hardware can include hardware processor 602, memory and/or storage 604, an input device controller 606, an input device 608, display/audio drivers 610, display and audio output circuitry 612, communication interface(s) 614, an antenna 616, and a bus 618.

Figure 6:
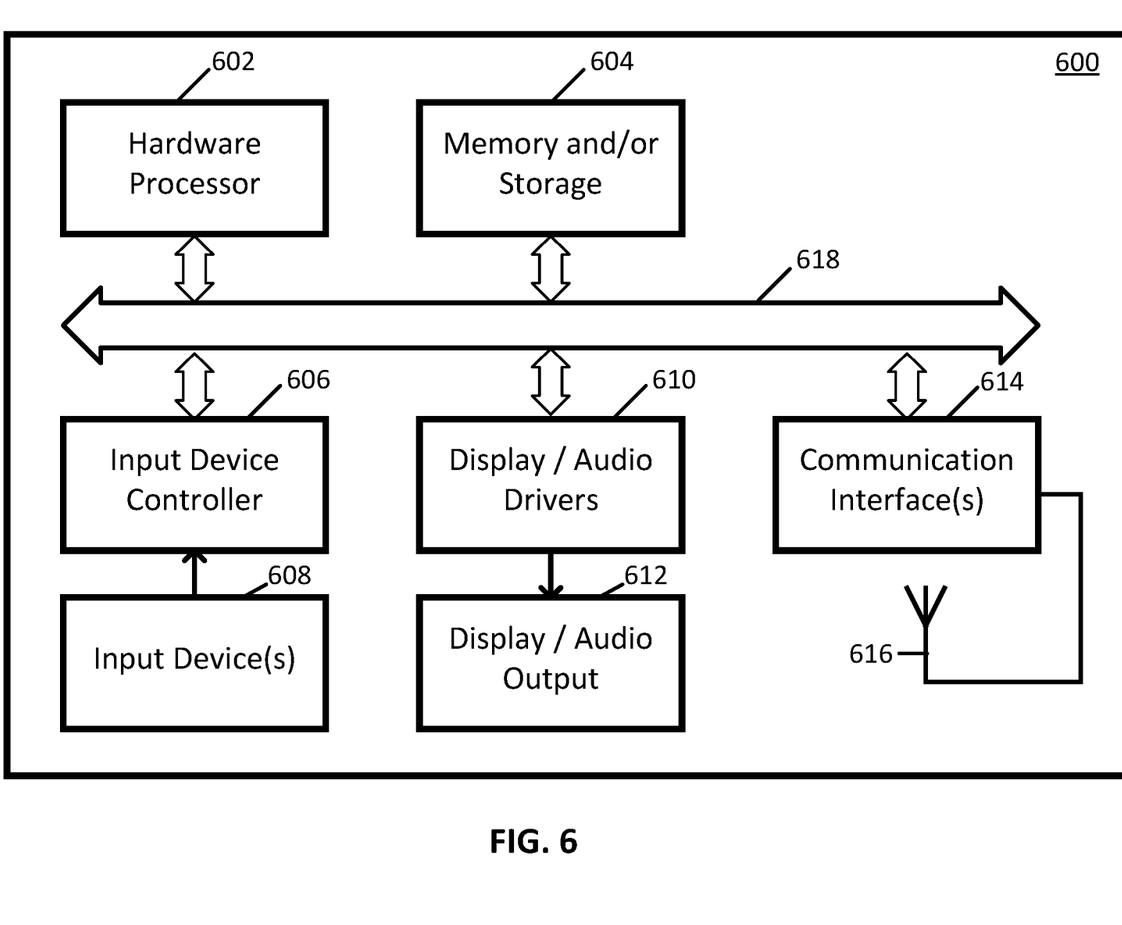
FIG. 6 shows a detailed example of hardware that can be used in a server and/or a user device of FIG. 5 in accordance with some embodiments of the disclosed subject matter.

Hardware processor 602 can include any suitable hardware processor, such as a microprocessor, a micro-controller, digital signal processor(s), dedicated logic, and/or any other suitable circuitry for controlling the functioning of a general-purpose computer or a special-purpose computer in some embodiments. In some embodiments, hardware processor 602 can be controlled by a computer program stored in memory and/or storage 604 of a user device 510. For example, in some embodiments, the computer program can cause hardware processor 602 to request a web page, receive a web page and/or any other suitable information, present a web page, monitor for alteration of a web page, and/or perform any other suitable functions. In some embodiments, hardware processor 602 can be controlled by a server program stored in memory and/or storage 604 any of servers 502. For example, in some embodiments, the server program can cause hardware processor 602 to receive a request for a web page, generate a web page, create a reference footprint corresponding to the web page, serve a web page and/or any other suitable information, and/or perform any other suitable functions.

Memory and/or storage 604 can be any suitable memory and/or storage for storing programs, data, media content, and/or any other suitable information in some embodiments. For example, memory and/or storage 604 can include random access memory, read-only memory, flash memory, hard disk storage, optical media, and/or any other suitable memory.

Input device controller 606 can be any suitable circuitry for controlling and receiving input from one or more input devices 608 in some embodiments. For example, input device controller 606 can be circuitry for receiving input from a touchscreen, from a keyboard, from a mouse, from one or more buttons, from a voice recognition circuit, from a microphone, from a camera, from an optical sensor, from an accelerometer, from a temperature sensor, from a near field sensor, and/or any other type of input device.

Display/audio drivers 610 can be any suitable circuitry for controlling and driving output to one or more display/audio output devices 612 in some embodiments. For example, display/audio drivers 610 can be circuitry for driving a touchscreen, a flat-panel display, a cathode ray tube display, a projector, a speaker or speakers, and/or any other suitable display and/or presentation devices.

Communication interface(s) 614 can be any suitable circuitry for interfacing with one or more communication networks, such as network 508 as shown in FIG. 5. For example, interface(s) 614 can include network interface card circuitry, wireless communication circuitry, and/or any other suitable type of communication network circuitry.

Antenna 616 can be any suitable one or more antennas for wirelessly communicating with a communication network (e.g., communication network 508) in some embodiments. In some embodiments, antenna 616 can be omitted.

Bus 618 can be any suitable mechanism for communicating between two or more components 602, 604, 606, 610, and 614 in some embodiments.

Any other suitable components can be included in hardware 600 in accordance with some embodiments.

In some embodiments, at least some of the above described blocks of the processes of FIGS. 1-4 can be executed or performed in any order or sequence not limited to the order and sequence shown in and described in connection with the figures. Also, some of the above blocks of FIGS. 1-4 can be executed or performed substantially simultaneously where appropriate or in parallel to reduce latency and processing times. Additionally or alternatively, some of the above described blocks of the processes of FIGS. 1-4 can be omitted.

In some embodiments, any suitable computer readable media can be used for storing instructions for performing the functions and/or processes herein. For example, in some embodiments, computer readable media can be transitory or non-transitory. For example, non-transitory computer readable media can include media such as non-transitory forms of magnetic media (such as hard disks, floppy disks, and/or any other suitable magnetic media), non-transitory forms of optical media (such as compact discs, digital video discs, Blu-ray discs, and/or any other suitable optical media), non-transitory forms of semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Accordingly, methods, systems, and media for detecting alteration of a web page are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for detecting alteration of a web page, comprising:
   requesting, using a hardware processor of a user device, a web page;
   receiving, using the hardware processor of the user device, the web page;
   analyzing, using the hardware processor of the user device, the web page;
   generating, using the hardware processor of the user device, a forensic footprint associated with the web page based on the analyzing;
   requesting a reference footprint using an identifier corresponding to the web page from a server;
   receiving the reference footprint from the server;
   determining, using the hardware processor of the user device, whether the forensic footprint matches the reference footprint associated with the web page; and
   in response to determining that the forensic footprint does not match the reference footprint, blocking, using the hardware processor of the user device, at least a portion of the web page from being presented.

2. The method of claim 1, wherein the forensic footprint comprises at least one of a size of the web page, a number of scripted files included in the web page, a number of user input fields included in the web page, a number of selectable icons included in the web page, a number of images included in the web page, and information indicating content of the web page.

3. The method of claim 1, wherein the reference footprint is generated prior to the receiving.

4. The method of claim 1, further comprising at least one of redirecting a browser to another web page and presenting a notification to a user.

5. The method of claim 1, further comprising, in response to determining that the forensic footprint matches the reference footprint, iteratively performing the analyzing, the generating, and the determining after a predetermined amount of time.

6. A system for detecting alteration of a web page, comprising:
   a hardware processor of a user device configured to:
      request a web page;
      receive the web page;
      analyze the web page;
      generate a forensic footprint associated with the web page based on the analyzing;
      request a reference footprint using an identifier corresponding to the web page from a server;
      receive the reference footprint from the server;
      determine whether the forensic footprint matches reference footprint associated with the web page; and
      in response to determining that the forensic footprint does not match the reference footprint, blocking at least a portion of the web page from being presented.

7. The system of claim 6, wherein the forensic footprint comprises at least one of a size of the web page, a number of scripted files included in the web page, a number of user input fields included in the web page, a number of selectable icons included in the web page, a number of images included in the web page, and information indicating content of the web page.

8. The system of claim 6, wherein the reference footprint is generated prior to the receiving.

9. The system of claim 6, wherein the hardware processor is further configured to perform at least one of redirecting a browser to another web page and presenting a notification to a user.

10. The system of claim 6, wherein the hardware processor is further configured to, in response to determining that the forensic footprint matches the reference footprint, iteratively perform the analyzing, the generating, and the determining after a predetermined amount of time.

11. A non-transitory computer-readable medium containing computer-executable instructions that, when executed by a processor of a user device, cause the processor to perform a method for detecting alteration of a web page, the method comprising:
   requesting a web page;
   receiving, at the user device, the web page;
   analyzing a web page;
   generating a forensic footprint associated with the web page based on the analyzing;
   requesting a reference footprint using an identifier corresponding to the web page from a server;
   receiving the reference footprint from the server;
   determining at the user device whether the forensic footprint matches reference footprint associated with the web page; and
   in response to determining at the user device that the forensic footprint does not match the reference footprint, blocking at least a portion of the web page from being presented.

12. The non-transitory computer-readable medium of claim 11, wherein the forensic footprint comprises at least one of a size of the web page, a number of scripted files included in the web page, a number of user input fields included in the web page, a number of selectable icons included in the web page, a number of images included in the web page, and information indicating content of the web page.

13. The non-transitory computer-readable medium of claim 11, wherein the reference footprint is generated prior to the receiving.

14. The non-transitory computer-readable medium of claim 11, further comprising at least one of redirecting a browser to another web page and presenting a notification to a user.

15. The non-transitory computer-readable medium of claim 11, the method further comprising, in response to determining that the forensic footprint matches the reference footprint, iteratively performing the analyzing, the generating, and the determining after a predetermined amount of time.

* * * * *